(12) United States Patent
Qin

(10) Patent No.: US 9,229,270 B2
(45) Date of Patent: Jan. 5, 2016

(54) LIQUID CRYSTAL DISPLAY SCREEN AND DISPLAY DEVICE

(71) Applicant: BOE TECHNOLOGY GROUP CO., LTD., Beijing (CN)

(72) Inventor: Guangkui Qin, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 73 days.

(21) Appl. No.: 14/106,647

(22) Filed: Dec. 13, 2013

(65) Prior Publication Data

US 2014/0168557 A1 Jun. 19, 2014

(30) Foreign Application Priority Data

Dec. 14, 2012 (CN) .......................... 2012 1 0546701

(51) Int. Cl.
| | | |
|---|---|---|
| G02F 1/1335 | (2006.01) | |
| G02F 1/136 | (2006.01) | |
| G02F 1/1343 | (2006.01) | |
| G02F 1/13363 | (2006.01) | |

(52) U.S. Cl.
CPC ...... *G02F 1/133528* (2013.01); *G02F 1/13363* (2013.01); *G02F 1/134363* (2013.01); *G02F 2001/134372* (2013.01); *G02F 2413/02* (2013.01); *G02F 2413/05* (2013.01)

(58) Field of Classification Search
CPC .......... G02F 1/13363; G02F 1/133634; G02F 2202/40; G02F 1/133528; G02F 1/133526; G02F 1/1368; G02F 1/136217; G02F 1/134363; G02F 1/133707; G02F 1/136213; G02B 5/3083; G02B 5/3016; G02B 5/3033; H01L 27/1214
USPC ...................................... 349/117, 96, 43, 141
See application file for complete search history.

(56) References Cited

U.S. PATENT DOCUMENTS

| | | | |
|---|---|---|---|
| 6,226,061 B1 * | 5/2001 | Tagusa ............................. | 349/84 |
| 2002/0118323 A1 * | 8/2002 | Itou et al. ...................... | 349/113 |

(Continued)

FOREIGN PATENT DOCUMENTS

| | | |
|---|---|---|
| CN | 1487340 A | 4/2004 |
| CN | 1595247 A | 3/2005 |

(Continued)

OTHER PUBLICATIONS

First Office Action for corresponding Chinese Patent Application No. 201210546701.6, 15 pages (including English translation), (Sep. 29, 2014).

(Continued)

*Primary Examiner* — Mike Qi
(74) *Attorney, Agent, or Firm* — Blakely, Sokoloff, Taylor & Zafman LLP

(57) ABSTRACT

The present invention relates to liquid display technology, and provides a liquid crystal display screen and a display device. A first and a second optical compensation film are disposed on each side of the liquid crystal layer respectively. By the first optical compensation film, a polarized light obtained from light non-normally incident into a first polarizing layer is compensated so that the polarized light becomes a first elliptically polarized light. By means of the phase retardation function of the liquid crystal layer, the first elliptically polarized light is converted into a second elliptically polarized light with its polarization direction consistent with that of the first elliptically polarized light and its rotation direction opposite to that of the first elliptically polarized light. By the second optical compensation film, the second elliptically polarized light is compensated into a polarized light capable of being absorbed completely by a second polarizing layer.

18 Claims, 4 Drawing Sheets

(56) References Cited

U.S. PATENT DOCUMENTS

| | | |
|---|---|---|
| 2003/0058264 A1* | 3/2003 | Takako et al. ............... 345/698 |
| 2006/0203163 A1* | 9/2006 | Tasaka ........................ 349/117 |
| 2010/0245725 A1 | 9/2010 | Kaihoko et al. |

FOREIGN PATENT DOCUMENTS

| | | |
|---|---|---|
| CN | 1726423 A | 1/2006 |
| CN | 202141874 U | 2/2012 |
| CN | 102687064 A | 9/2012 |
| CN | 102707489 A | 10/2012 |
| WO | WO 2011/053081 A2 | 5/2011 |

OTHER PUBLICATIONS

European Patent Office Communication enclosing Extended European Search Report for corresponding European Patent Application No. 13197123.6, 11 pages, (Oct. 28, 2014).

* cited by examiner

LIQUID CRYSTAL DISPLAY SCREEN AND DISPLAY DEVICE

FIELD OF THE INVENTION

The present invention relates to liquid crystal display technology, and in particular, to a liquid crystal display screen and a display device.

BACKGROUND OF THE INVENTION

The In-Plane Switching (IPS) technology is a wide-viewing angle technology applied to liquid crystal display (LCD), which is widely used in manufacturing LCD television to improve the viewing angle effectively. As shown in FIG. 1, an electrode structure of such LCD television includes first electrodes 101 and second electrodes 102, and the liquid crystal molecules in the IPS-mode display are arranged in parallel with each other when no voltage is applied to the electrode structure.

The Advanced Super Dimension Switch (ADS) technology is a core technology of planar-electric-field wide-viewing angle, in which a multidimensional electric field is formed by an electric field generated from the edges of the slit electrodes located in a same plane and an electric field generated between the slit electrode layer and the plate electrode layer, so that all the liquid crystal molecules located among the slit electrodes and located right over the slit electrodes in the liquid crystal cell can rotate. Thus, both the operating efficiency and the transmission efficiency of the liquid crystal material are improved. With the ADS technology, the TFT-LCD product has the advantages of improved picture quality, high resolution, high transmittance, low power consumption, wide viewing angle, high aperture ratio, low chromatic aberration, no squeezing water ripples, etc. For different applications, the improved ADS technologies include high-transmittance I-ADS technology, high-aperture ratio H-ADS technology and high-resolution S-ADS technology, and so on. As shown in FIG. 2, the electrode structure of ADS-mode LCD screen comprises a color filter (CF) substrate 201, array substrate including a plural of thin film transistors (TFTs) (hereinafter referred as thin film transistor substrate or TFT substrate) 205 disposed opposite to the CF substrate 201, and a first electrode 204, an insulating layer 203 and second electrodes 202, which are disposed between the CF substrate 201 and the TFT substrate 205 in this order, from bottom to top. Similar to that in the IPS-mode LCD screen, the liquid crystal molecules in the ADS-mode LCD screen are also arranged in parallel with each other when no voltage is applied to the electrode structure.

In order to enable the LCD screen to forming images, it is necessary to provide a polarizing layer to the upper side and the lower side of the liquid crystal cell (including the TFT substrate and the CF substrate opposite to each other, and the liquid crystal layer between the TFT substrate and the CF substrate), respectively, that is, a first polarizing layer located at the TFT substrate side and a second polarizing layer located at the CF substrate side. In both the IPS-mode and the ADS-mode LCD screens, the transmission axis of the first polarizing layer is perpendicular to the transmission axis of the second polarizing layer, and parallel to the absorption axis of the second polarizing layer. When not being applied with power, the polarized light transmitting through the first polarizing layer is absorbed by the second polarizing layer completely. However, light leakage may occur in both the IPS-mode and the ADS-mode LCD screens. For example, in the case that the azimuth angle of the incident light with respect to the polarizing layer is 45°, and the polar angle of the incident light with respect to the polarizing layer is 60°, the light leakage is most severe. The principle of the light leakage will be described with reference to FIG. 3. The light leakage results from that, when the light transmits along above directions, the transmission axes of the polarizing layers at the upper and the lower sides of the liquid crystal cell are not orthogonal to each other, and the direction of the light axis of the liquid crystal molecules is changed to some extent.

In the following description, such change will be described by using the Poincare Sphere. The Poincare Sphere is a mathematic model invented by the Jules Henri Poincaré in 1892. In the stokes space, it is introduced the normalized radius $S0=1$; $S0^2=S1^2+S2^2+S3^2$, wherein S1, S2 and S3 correspond to the coordinates x, y and z of the solid sphere respectively, and are used to represent the polarization state of the light. Any one point on the sphere corresponds to a certain polarization state of the completely polarized light with unit intensity. The points at the equator of the Poincare Sphere represent linearly polarized light, the upper and lower poles correspond to right-circularly polarized light and left-circularly polarized light respectively, and other points correspond to elliptically polarized light. The polarized lights corresponding to the points at the same longitude on the Poincare Sphere have identical polarized directions.

As shown in FIG. 3, when the incident light is incident into the first polarizing layer at a polar angle of 60 degree and an azimuth angle of 45 degree, the transmission axis of the first polarizing layer on the TFT substrate side will deflect to the point T in the figure, while the absorption axis of the second polarizing layer on the CF substrate side will deflect to the point A in the figure. Since the transmission axis of the first polarizing layer and the absorption axis of the second polarizing layer do not consist with each other any more, and the light axis of the liquid crystal molecules also deflect by a certain angle at the same time, the polarized light transmitting through the first polarizing layer cannot be absorbed by the second polarizing layer completely, and thus the light leakage occurs.

Nowadays, the wide-viewing angle optical compensation for the ADS-mode and IPS-mode LCD screens has been widely applicable. However, the existing optical compensation methods each only works for a certain display mode of the LCD screen. The display modes of the ADS-mode and IPS-mode LCD screens may be classified into an E mode, an O mode and a multi domain mode. In an E-mode LCD screen, the direction of the slow axis of the liquid crystal molecules consists with the direction of the transmission axis of the first polarizing layer on the TFT substrate side. In an O-mode LCD screen, the direction of the slow axis of the liquid crystal molecules consists with the direction of the transmission axis of the second polarizing layer on the CF substrate side. The multi domain mode is a mixed mode formed by the E mode and the O mode. For an E-mode LCD screen, the compensation film should be disposed between the TFT substrate and the first polarizing layer on the TFT substrate side. For an O-mode LCD screen, the compensation film should be disposed between the CF substrate and the second polarizing layer on the CF substrate side. For the multi domain mode, there is still no any proper optical compensation method nowadays. The reasons are presented as follows.

In the E-mode liquid crystal display screen, the transmission axis of the first polarizing layer and the slow axis of the liquid crystal molecule will deflect to the point A shown in FIG. 3 since the slow axis of the liquid crystal molecule consists with the transmission axis of the first polarizing layer in direction. In this case, the compensation may be achieved only by performing compensation such that the polarization direction of the polarized light incident from the TFT substrate side is changed from the point T to the point A before the polarized light incident from the TFT substrate side transmits through the liquid crystal material. The liquid crystal material without being applied with voltage will not change the polarization direction of the polarized light, which enables the polarized light having transmitted through the liquid crystal material to be directly absorbed by the second polarizing layer on the CF substrate side. The optical-compensated structure for the E-mode liquid crystal display screen is shown in FIG. 4.

In the E-mode liquid crystal display screen, the optical axis of the liquid crystal molecule will deflect to the point T shown in FIG. 3. The polarization direction of the polarized light incident from the TFT substrate side still directs to the point T after the polarized light incident from the TFT substrate side transmits through the liquid crystal material. The liquid crystal material without being applied with voltage will not change the polarization direction of the polarized light. Accordingly, if the polarization direction of the polarized light is compensated to change from the point T to the point A after the polarized light transmits through the liquid crystal material, it can ensure that the light incident to the second polarizing layer may be completely absorbed. The optical-compensated structure for the O-mode liquid crystal display screen is shown in FIG. 5.

The multi domain-mode liquid crystals of IPS mode and ADS mode liquid crystal display screens may be classified into two types. In one type of the liquid crystal, the liquid crystal molecules have two initial orientations perpendicular to each other, and may be obtained by way of the optical orientation. In the other type of the liquid crystal, the liquid crystal molecules have a unique initial orientation and may be obtained by ways of the ordinary film orientation and the optical orientation, in which there is a certain angle between the electrodes. Despite of the type of the multi domain-mode liquid crystal, a method for optically compensating the light leakage has not been proposed for the LCD with multi domain-mode liquid crystal since it is a mixture mode of E- and O-modes.

In general, the methods for optically compensating the light leakage are different between the LCD of E-mode and that of O-mode at present. Furthermore, it has not been proposed an optical compensation method for the LCD with multi domain-mode liquid crystal formed by E-mode and O-mode liquid crystal.

SUMMARY OF THE INVENTION

The embodiments of the invention provide a LCD screen and a display device which can achieve compensation for the light leakage occurring in any of the LCD screens of E mode, of O mode and of multi-domain mode formed by E mode and O mode.

A liquid crystal display (LCD) screen comprises a thin film transistor (TFT) substrate, a color filter (CF) substrate, liquid crystal layer disposed between the TFT substrate and the CF substrate, a first polarizing layer at outer side of the TFT substrate, and a second polarizing layer at outer side of the CF substrate, wherein it further comprises:

a first optical compensation film disposed between the first polarizing layer and the TFT substrate, a slow axis of which is parallel or perpendicular to a transmission axis of the first polarizing layer, the first optical compensation film being configured to compensate a polarized light obtained from light non-normally incident into the first polarizing layer so that the polarized light becomes a first elliptically polarized light, polarization direction of the first elliptically polarized light is the same as that of a polarized light obtained from light incident into the first polarizing layer at an azimuth angle of 90 degree;

a second optical compensation film disposed between the second polarizing layer and the CF substrate, a slow axis of which is perpendicular to the slow axis of the first optical compensation film, a refractive index and a phase retardation of the second optical compensation film are the same as those of the first optical compensation respectively, and the liquid crystal layer configured to convert the first elliptically polarized light into a second elliptically polarized light, with its polarization direction consistent with that of the first elliptically polarized light and its rotation direction opposite to that of the first elliptically polarized light.

A display device comprises a LCD screen provided by any one of the embodiment of the invention.

The embodiments of the invention provide a LCD screen and a display device which utilize the characteristics that the liquid crystal material will not change the polarization direction of the polarized light obtained from light incident into the first polarizing layer at an azimuth angle of 90 degree, and that the transmission axis of the first polarizing layer and the absorption axis of the second polarizing layer will deflect in opposite directions and by identical magnitude if the light is incident into the first polarizing layer. Based on such characteristics, a first and a second optical compensation films are disposed on each side of the liquid crystal layer, respectively. A polarized light obtained from light non-normally incident into a first polarizing layer is compensated by means of the first optical compensation film so that the polarized light becomes a first elliptically polarized light. Also, by means of the phase retardation function of the liquid crystal, the first elliptically polarized light is converted into a second elliptically polarized light with its polarization direction consistent with that of the first elliptically polarized light and its rotation direction opposite to that of the first elliptically polarized light. Then, by means of the second optical compensation film, the second elliptically polarized light is compensated into a polarized light capable of being absorbed completely by a second polarizing layer. Thus, compensation for the light leakage occurring in any of the LCD screens of E mode, of O mode and of multi domain mode formed by E mode and O mode is achieved.

DETAILED DESCRIPTION OF THE EMBODIMENTS

Figure 1:
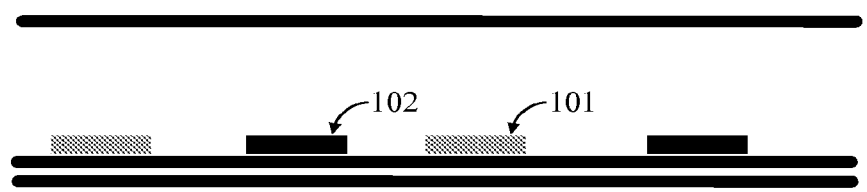
FIG. 1 shows an electrode structure of the IPS-mode LCD screen according to the prior art.
Figure 2:
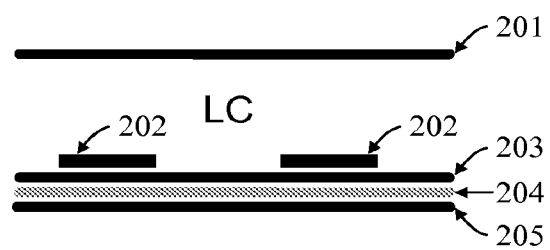
FIG. 2 shows an electrode structure of the ADS-mode LCD screen according to the prior art.
Figure 3:
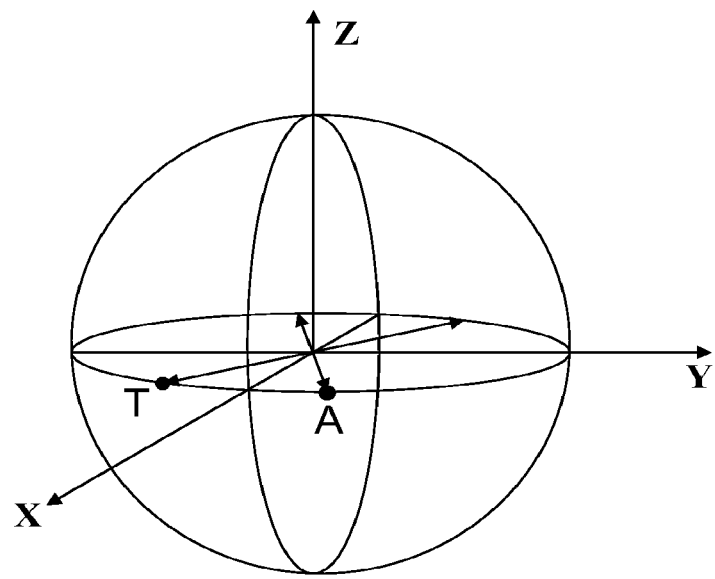
FIG. 3 is a schematic diagram illustrating the deflection of the transmission axis of the first polarizing layer and the deflection of the absorption axis of the second polarizing layer when the incident light is incident into the first polarizing layer at a polar angle of 60 degree and a azimuth angle of 45 degree, according to the prior art.
Figure 4:
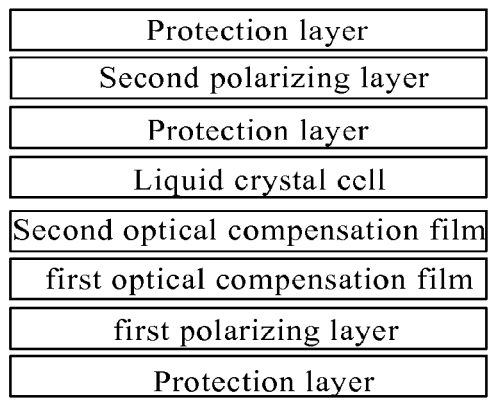
FIG. 4 is a schematic diagram illustrating a structure of E-mode LCD screen according to the prior art.
Figure 5:
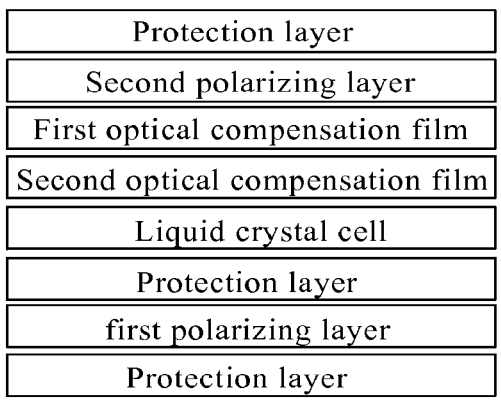
FIG. 5 is a schematic diagram illustrating a structure of O-mode LCD screen according to the prior art.
Figure 6:
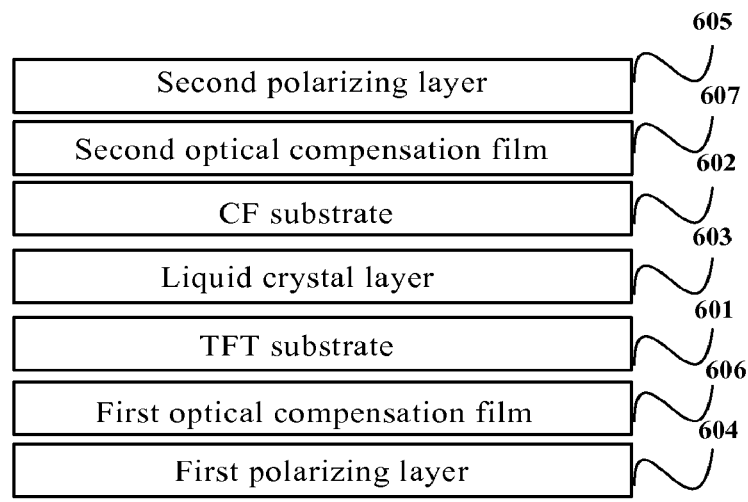
FIG. 6 is a schematic diagram illustrating a structure of a LCD screen according to an embodiment of the invention.

As shown in FIG. 6, an embodiment of the invention provides a LCD screen comprising a TFT substrate 601, a CF substrate 602, liquid crystal layer 603 disposed between the TFT substrate 601 and the CF substrate 602, a first polarizing layer 604 at outer side of the TFT substrate, and a second polarizing layer 605 at outer side of the CF substrate 602. The LCD screen further comprises:

a first optical compensation film 606 disposed between the first polarizing layer 604 and the TFT substrate 601, a slow axis of which is parallel or perpendicular to a transmission axis of the first polarizing layer 604, the first optical compensation film 606 being configured to compensate a polarized light obtained from light non-normally incident into the first polarizing layer 604 so that the polarized light becomes a first elliptically polarized light, polarization direction of the first elliptically polarized light is the same as that of a polarized light obtained from light incident at an azimuth angle of 90 degree into the first polarizing layer 604;

a second optical compensation film 607 disposed between the second polarizing layer 605 and the CF substrate 602, a slow axis of which is perpendicular to the slow axis of the first optical compensation film 606, a refractive index and a phase retardation of the second optical compensation film 607 are the same as those of the first optical compensation 606 respectively; and the liquid crystal layer 603, which is configured to convert the first elliptically polarized light into a second elliptically polarized light, with its polarization direction consistent with that of the first elliptically polarized light and its rotation direction opposite to that of the first elliptically polarized light.

Since the liquid crystal layer 603 without being applied with voltage will not change the polarization direction of the polarized light obtained from light incident into the first polarizing layer 604 at an azimuth angle of 90 degree, the first optical compensation film 606 with its slow axis perpendicular or parallel to the transmission axis of the first polarizing layer 604 is disposed between the first polarizing layer 604 and the TFT substrate 601, in order that a polarized light obtained from light non-normally incident into the first polarizing layer 604 is changed into a first elliptically polarized light by means of such first optical compensation film 606, wherein the polarization direction of the first elliptically polarized light is the same as that of a polarized light obtained from light incident into the first polarizing layer 604 at an azimuth angle of 90 degree. In this case, the liquid crystal layer 603 will not change the polarization direction of the first elliptically polarized light. Also, by means of the phase retardation function of the liquid crystal layer 603, the first elliptically polarized light is converted into a second elliptically polarized light with its polarization direction consistent with that of the first elliptically polarized light and its rotation direction opposite to that of the first elliptically polarized light. Furthermore, since the transmission axis of the first polarizing layer 604 is parallel to the absorption axis of the second polarizing layer 605, when the light is non-perpendicularly incident into the first polarizing layer 604 and the second polarizing layer 605, the transmission axis of the first polarizing layer 604 deflects in an opposite direction and by an identical magnitude with respect to the deflection of the absorption axis of the second polarizing layer 605. Accordingly, by the second optical compensation film 607 which has a refractive index and a phase retardation as the same as those of the first optical compensation film 606 respectively, the second elliptically polarized light can be compensated into a polarized light capable of being absorbed completely by the second polarizing layer 605. As a result, the optical compensation for the light leakage is achieved.

The polarization direction of the polarized light obtained from light incident into the first polarizing layer 604 at a polar angle of 0 degree is identical to that of the polarized light obtained from light incident into the first polarizing layer 604 at an azimuth angle of 90 degree, thereby the first optical compensation film 606 will not compensate the polarized light. In addition, since the polarized light obtained from light incident into the first polarizing layer 604 at a polar angle of 0 degree does not deflect, the light leakage will not occur, and thus it is not necessary to compensate. As a result, in the LCD screen according to the embodiment of the invention, the light leakage will be overcome by the optical compensation for the polarized light obtained from light non-perpendicularly incident into the first polarized layer 604. Particularly, since the serious deflection of the polarized light obtained from light incident into the first polarizing layer 604 at a polar angle of 60 degree and an azimuth angle of 45 degree, the first optical compensation film may be designed for such polarized light so that the best compensation effect can be achieved.

The foregoing configurations for the first optical compensation film 606, the second optical compensation film 607 and the liquid crystal layer 603 can work in the compensation for the light leakage in any of the O-mode, the E-mode, and the multi domain-mode (which is a mixed mode formed by the O-mode and the E-mode) LCD screens. Thus, in the LCD screen according to the invention, the direction of the slow axis of the liquid crystal layer 603 may consist with the transmission axis of the first polarizing layer, or the direction of the slow axis of the liquid crystal molecules in the liquid crystal layer 603 may consist with the transmission axis of the second polarizing layer; or the liquid crystal molecules are mixed liquid crystal molecules formed by a type of liquid crystal molecules with its direction of slow axis consistent with the transmission axis of the first polarizing layer and a type of liquid crystal molecules with its direction of slow axis consistent with the transmission axis of the second polarizing layer. That is to say, the liquid crystal layer 603 may be formed by the O-mode liquid crystal material, the E-mode liquid crystal material, or the multi domain-mode liquid crystal material which is formed by the O-mode and the E-mode liquid crystal materials.

Further, the refractivities and the phase retardants of the first optical compensation film 606 and the second optical compensation film 607 and the phase retardant of the liquid crystal layer 603 may be set so that the first optical compensation film 606 can compensate the polarized light obtained from light non-perpendicularly incident into the first polarizing layer 604 to obtain the first elliptically polarized light, and that the liquid crystal layer 603 can convert the first elliptically polarized light into the second elliptically polarized light with its polarization direction consistent with that of the first elliptically polarized light and its rotation direction opposite to that of the first elliptically polarized light.

In practice, the refractivities and the phase retardants of the first optical compensation film 606 and the second optical compensation film 607 and the phase retardant of the liquid crystal layer 603 may be determined based on empiric values, as long as such first optical compensation film 606 can compensate the polarized light obtained from light non-perpendicularly incident into the first polarizing layer 604 to obtain the first elliptically polarized light, and such liquid crystal layer 603 can convert the first elliptically polarized light into the second elliptically polarized light with its polarization direction consistent with that of the first elliptically polarized light and its rotation direction opposite to that of the first elliptically polarized light.

For example, when the slow axis of the first optical compensation film 606 is parallel to the transmission axis of the first polarizing layer 604, it may be configured that the refractive index of the first optical compensation film 606 is larger or equal to 0.25, the phase retardant of the first optical compensation film 606 is 20 nm to 280 nm, and the phase retardant of the liquid crystal layer 603 is 270 nm to 560 nm.

Next, the effect of such configurations on the light leakage of the E-mode and the O-mode liquid crystal molecules will be analyzed by using the Poincare sphere.

Figure 7:
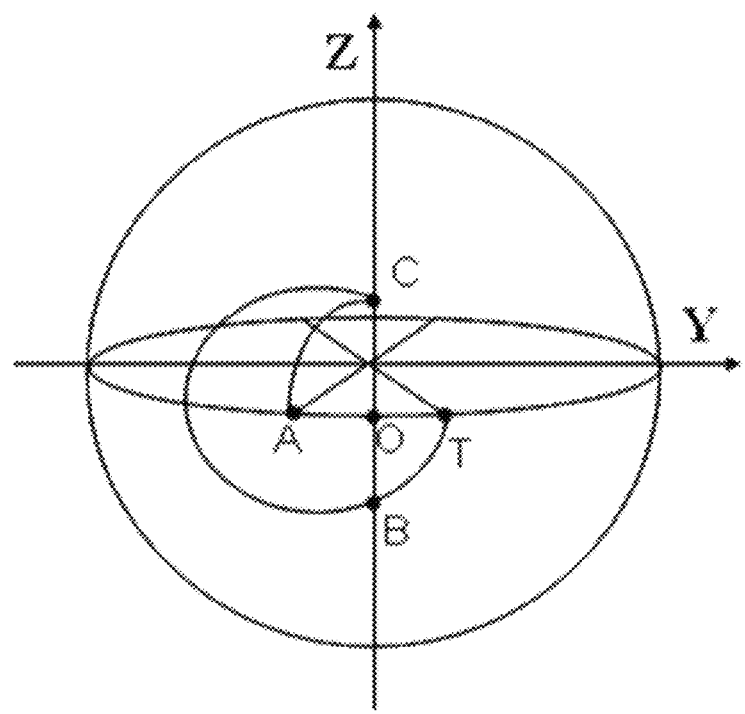
FIG. 7 is a schematic diagram illustrating a Poincare Sphere for optically compensating an E-mode LCD screen according to an embodiment of the invention.

For the liquid crystal layer 603 in E-mode LCD screen, as shown in FIG. 7, the point T represents the polarization direction of a polarized light obtained from light incident into the first polarizing layer 604 at an azimuth angle of 45 degree, the point A represents the polarization direction corresponding to the absorption axis of the second polarizing layer 605 when light is incident into the first polarizing layer 604 at an azimuth angle of 45 degree, and the point O represents the polarization direction of a polarized light obtained from light incident into the first polarizing layer 604 at an azimuth angle of 90 degree. The distance on the equator between the points A and O (hereinafter referred as "AO" in brief) and the distance on the equator between the points O and T (hereinafter referred as "OT" in brief) are identical to each other. After a polarized light with its polarization state corresponding to the point T transmits through the first optical compensation film 606, its polarization state deflects to the point B. The point B represents an elliptically polarized light with a polarization direction consistent with the polarization direction at the point O. When the polarized light with its polarization state corresponding to the point B transmits through the E-mode liquid crystal layer 603, its polarization state varies to the point C. The variation trace of its polarization state is shown as the arc BC. The point C represents an elliptically polarized light with a polarization direction identical to and a rotation direction opposite to those at the point B. After the polarized light corresponding to the point C transmits through the second optical compensation film 607, its polarization state varies to the point A. Thus, this polarized light can be absorbed completely so that the light leakage will not occur.

Figure 8:
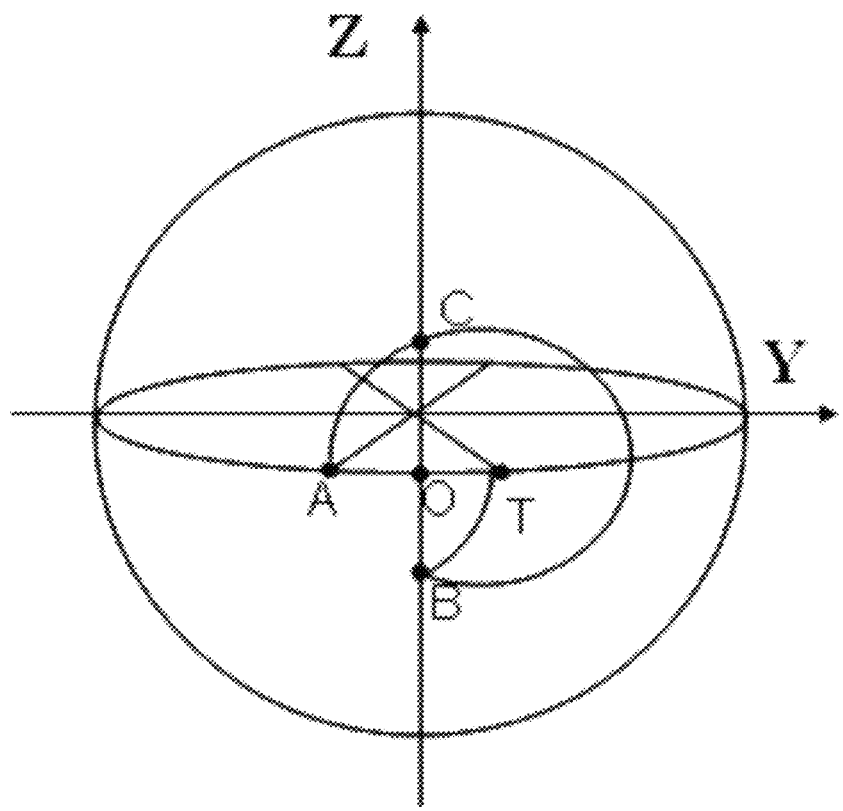
FIG. 8 is a schematic diagram illustrating a Poincare Sphere for optically compensating an O-mode LCD screen according to an embodiment of the invention.

For the liquid crystal layer 603 in O-mode LCD screen, as shown in FIG. 8, the point T represents the polarization direction of a polarized light obtained from light incident into the first polarizing layer 604 at an azimuth angle of 45 degree, the point A represents the polarization direction corresponding to the absorption axis of the second polarizing layer 605 when light is non-perpendicularly incident into the first polarizing layer 604, and the point O represents the polarization direction of a polarized light obtained from light incident into the first polarizing layer 604 at an azimuth angle of 90 degree. The distances AO and OT, both of which are on the equator, are identical to each other. After a polarized light with its polarization state corresponding to the point T transmits through the first optical compensation film 606, its polarization state deflects to the point B. The point B represents an elliptically polarized light with a polarization direction consistent with the polarization direction at the point O. When the polarized light with its polarization state being at the point B transmits through the E-mode liquid crystal layer 603, its polarization state varies to the point C. The variation trace of its polarization state is shown as the arc BC. The point C represents an elliptically polarized light with a polarization direction identical to and a rotation direction opposite to those at the point B. After the polarized light corresponding to the point C transmits through the second optical compensation film 607, its polarization state varies to the point A. Thus, this polarized light can be absorbed completely so that the light leakage will not occur.

Specifically, as the refractive index of the first optical compensation film 606 is set larger, the phase retardant of the first optical compensation film 606 may be set smaller and the phase retardant of the liquid crystal layer 603 may be set smaller, so that a better compensation effect may be achieved. When the refractive index of the first optical compensation film 606 is set to 0.25, the phase retardant of the first optical compensation film 606 may be set to 270 nm to 280 nm, and the phase retardant of the liquid crystal layer 603 may be set to 540 nm to 560 nm. When the refractive index of the first optical compensation film 606 is set to 1, the phase retardant of the first optical compensation film 606 may be set to 80 nm to 110 nm, and the phase retardant of the liquid crystal layer 603 may be set to 340 nm to 370 nm. When the refractive index of the first optical compensation film 606 is set to 3.5, the phase retardant of the first optical compensation film 606 may be set to 35 nm to 60 nm, and the phase retardant of the liquid crystal layer 603 may be set to 280 nm to 320 nm.

Of course, in the case that the slow axis of the first optical compensation film 606 is parallel to the transmission axis of the first polarizing layer 604, any other feasible settings for the refractive index and the phase retardant of the first optical compensation film 606 and the phase retardant of the liquid crystal layer 603 may be conceivable by a skilled in the art, and will not be repeated herein.

For example, when the slow axis of the first optical compensation film 606 is perpendicular to the transmission axis of the first polarizing layer 604, it may be configured that the refractive index of the first optical compensation film 606 is smaller or equal to 0.25, the phase retardant of the first optical compensation film 606 is 20 nm to 280 nm, and the phase retardant of the liquid crystal layer is 270 nm to 560 nm.

Next, the effect of such configurations on the light leakage of the E-mode and the O-mode LCD screens will be analyzed by using the Poincare sphere.

Figure 9:
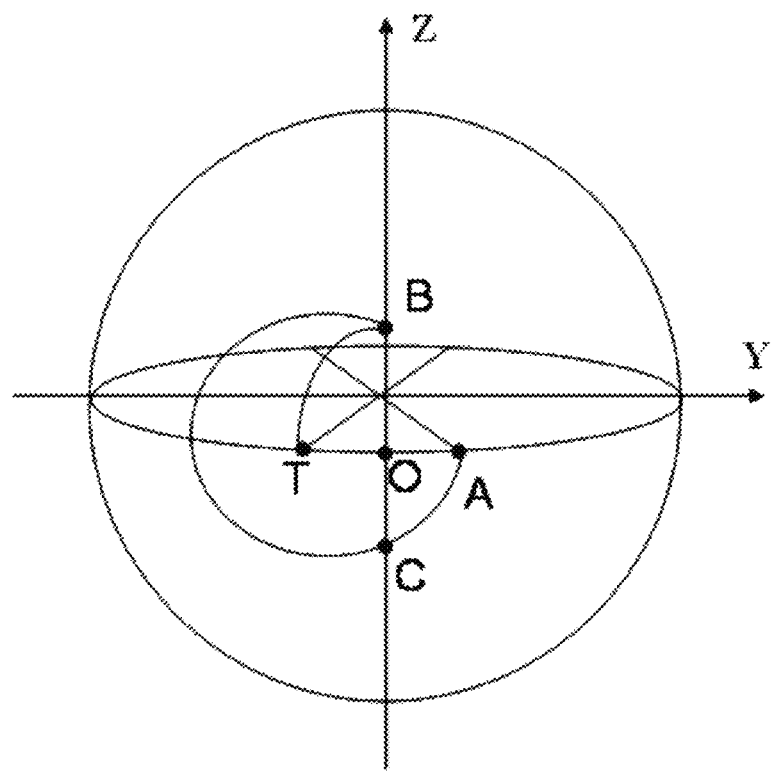
FIG. 9 is another schematic diagram illustrating a Poincare Sphere for optically compensating an E-mode LCD screen according to an embodiment of the invention.

For the liquid crystal layer 603 in E-mode LCD screen, as shown in FIG. 9, the point T represents the polarization direction of a polarized light obtained from light incident into the first polarizing layer 604 at an azimuth angle of 45 degree, the point A represents the polarization direction corresponding to the absorption axis of the second polarizing layer 605 when light is incident into the first polarizing layer 604 at an azimuth angle of 45 degree, and the point O represents the polarization direction of a polarized light obtained from light incident into the first polarizing layer 604 at an azimuth angle of 90 degree. The distances AO and OT, both of which are on the equator, are identical to each other. After a polarized light with its polarization state corresponding to the point T transmits through the first optical compensation film 606, its polarization state deflects to the point B. The point B represents an elliptically polarized light with a polarization direction consistent with the polarization direction at the point O. When the polarized light with its polarization state corresponding to the point B transmits through the E-mode liquid crystal layer 603, its polarization state varies to the point C, and the variation trace of its polarization state is shown as the arc BC. The point C represents an elliptically polarized light with a polarization direction identical to and a rotation direction opposite to those at the point B. After the polarized light corresponding to the point C transmits through the second optical compensation film 607, its polarization state varies to the point A. Thus, this polarized light can be absorbed completely so that the light leakage will not occur.

Figure 10:
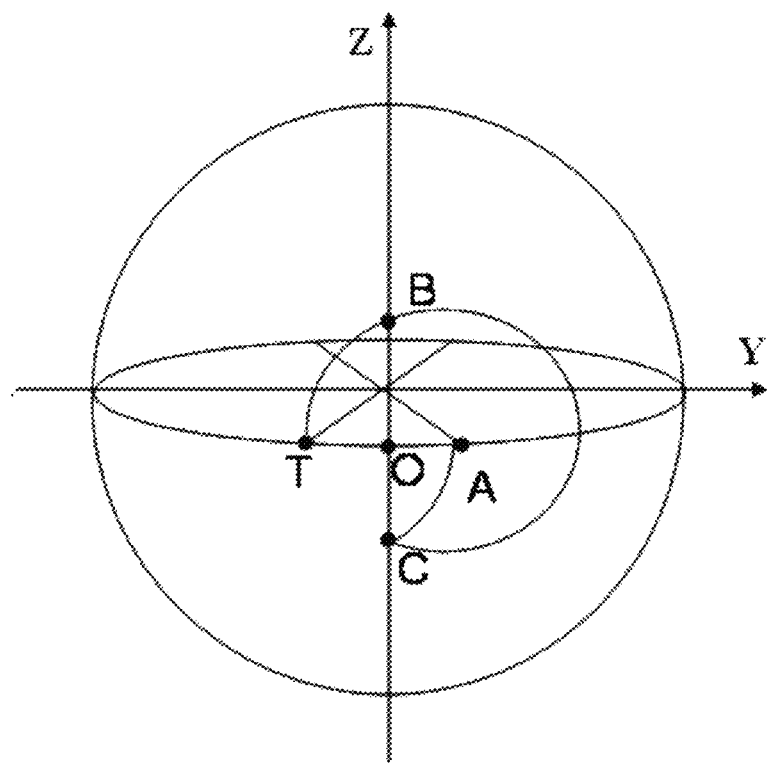
FIG. 10 is another schematic diagram illustrating a Poincare Sphere for optically compensating an O-mode LCD screen according to an embodiment of the invention.

For the liquid crystal layer 603 in O-mode LCD screen, as shown in FIG. 10, the point T represents the polarization direction of a polarized light obtained from light non-perpendicularly incident into the first polarizing layer 604, the point A represents the polarization direction corresponding to the absorption axis of the second polarizing layer 605 when light is incident into the first polarizing layer 604 at an azimuth angle of 45 degree, and the point O represents the polarization direction of a polarized light obtained from light incident into the first polarizing layer 604 at an azimuth angle of 90 degree. The distances AO and OT, both of which are on the equator, are identical to each other. After a polarized light with its polarization state corresponding to the point T transmits through the first optical compensation film 606, its polarization state deflects to the point B. The point B represents an elliptically polarized light with a polarization direction consistent with the polarization direction at the point O. When the polarized light with its polarization state corresponding to the point B transmits through the E-mode liquid crystal layer 603, its polarization state varies to the point C, and the variation trace of its polarization state is shown as the arc BC. The point C represents an elliptically polarized light with a polarization direction identical to and a rotation direction opposite to those at the point B. After the polarized light corresponding to the point C transmits through the second optical compensation film 607, its polarization state varies to the point A. Thus, this polarized light can be absorbed completely so that the light leakage will not occur.

Specifically, as the refractive index of the first optical compensation film 606 is set smaller, the phase retardant of the first optical compensation film 606 may be set smaller and the phase retardant of the liquid crystal layer 603 may be set smaller, so that a better compensation effect may be achieved. When the refractive index of the first optical compensation film 606 is set to 0, the phase retardant of the first optical compensation film 606 may be set to 80 nm to 110 nm, and the phase retardant of the liquid crystal layer 603 may be set to 340 nm to 370 nm. When the refractive index of the first optical compensation film 606 is set to −2.85, the phase retardant of the first optical compensation film 606 may be set to 35 nm to 60 nm, and the phase retardant of the liquid crystal layer 603 may be set to 280 nm to 320 nm.

Of course, in the case that the slow axis of the first optical compensation film 606 is perpendicular to the transmission axis of the first polarizing layer 604, any other feasible settings for the refractive index and the phase retardant of the first optical compensation film 606 and the phase retardant of the liquid crystal layer 603 may be conceivable by a skilled in the art, and will not be repeated herein.

An embodiment of the invention further provides a display device which comprises any one of the above mentioned LCD screens. Such display device may be any product or component with display function, such as liquid crystal panel, electronic paper, OLED panel, mobile telephone, tablet PC, television, display, laptop, digital album, navigator, and so on.

It is obviously for a skilled in the art that various modifications and variations may be made to the invention without departing from the spirit and scope of the invention. Thus, the invention is intended to cover these modifications and variations provided that they fall into the scope of the attached claims and its equivalent.

What is claimed is:

1. A liquid crystal display screen, comprising a thin film transistor substrate, a color filter substrate, liquid crystal layer disposed between the thin film transistor substrate and the color filter substrate, a first polarizing layer at outer side of the thin film transistor substrate, and a second polarizing layer at outer side of the color filter substrate, wherein further comprising:

a first optical compensation film disposed between the first polarizing layer and the thin film transistor substrate, a slow axis of which is parallel or perpendicular to a transmission axis of the first polarizing layer, the first optical compensation film being configured to compensate a polarized light obtained from light non-normally incident into the first polarizing layer so that the polarized light becomes a first elliptically polarized light, polarization direction of the first elliptically polarized light is the same as that of a polarized light obtained from light incident into the first polarizing layer at an azimuth angle of 90 degree;

a second optical compensation film disposed between the second polarizing layer and the color filter substrate, a slow axis of which is perpendicular to that of the first optical compensation film, a refractive index and a phase retardation of the second optical compensation film are the same as those of the first optical compensation film respectively, and wherein the liquid crystal layer is configured to convert the first elliptically polarized light into a second elliptically polarized light, with its polarization direction consistent with that of the first elliptically polarized light and its rotation direction opposite to that of the first elliptically polarized light.

2. The liquid crystal display screen of claim 1, wherein
a direction of a slow axis of liquid crystal molecules in the liquid crystal layer is consistent with the transmission axis of the first polarizing layer; or
the direction of the slow axis of the liquid crystal molecules is consistent with a transmission axis of the second polarizing layer; or
the liquid crystal molecules is a mixed liquid crystal molecules formed by a type of liquid crystal molecules with a direction of slow axis consistent with the transmission axis of the first polarizing layer and a type of liquid crystal molecules with a direction of slow axis consistent with the transmission axis of the second polarizing layer.

3. The liquid crystal display screen of claim 1, wherein
when the slow axis of the first optical compensation film is parallel to the transmission axis of the first polarizing layer, the refractive index of the first optical compensation film is larger than or equal to 0.25, the phase retardation of the first optical compensation film is 20 nm-280 nm, and a phase retardation of the liquid crystal layer is 270 nm-560 nm.

4. The liquid crystal display screen of claim 3, wherein
the refractive index of the first optical compensation film is 0.25, the phase retardation of the first optical compensation film is 270 nm-280 nm, and the phase retardation of the liquid crystal layer is 540 nm-560 nm.

5. The liquid crystal display screen of claim 3, wherein
the refractive index of the first optical compensation film is 1, the phase retardation of the first optical compensation film is 80 nm-110 nm, and the phase retardation of the liquid crystal layer is 340 nm-370 nm.

6. The liquid crystal display screen of claim 3, wherein the refractive index of the first optical compensation film is 3.5, the phase retardation of the first optical compensation film is 35 nm-60 nm, and the phase retardation of the liquid crystal layer is 280 nm-320 nm.

7. The liquid crystal display screen of claim 1, wherein when the slow axis of the first optical compensation film is perpendicular to the transmission axis of the first polarizing layer, the refractive index of the first optical compensation film is smaller than or equal to 0.25, the phase retardation of the first optical compensation film is 20 nm-280 nm, and a phase retardation of the liquid crystal layer is 270 nm-560 nm.

8. The liquid crystal display screen of claim 7, wherein the refractive index of the first optical compensation film is 0, the phase retardation of the first optical compensation film is 80 nm-110 nm, and the phase retardation of the liquid crystal layer is 340 nm-370 nm.

9. The liquid crystal display screen of claim 7, wherein the refractive index of the first optical compensation film is −2.85, the phase retardation of the first optical compensation film is 35 nm-60 nm, and the phase retardation of the liquid crystal layer is 280 nm-320 nm.

10. A display device, comprising a liquid crystal display screen comprising a thin film transistor substrate, a color filter substrate, liquid crystal layer disposed between the thin film transistor substrate and the color filter substrate, a first polarizing layer at outer side of the thin film transistor substrate, and a second polarizing layer at outer side of the color filter substrate, wherein further comprising:
a first optical compensation film disposed between the first polarizing layer and the thin film transistor substrate, a slow axis of which is parallel or perpendicular to a transmission axis of the first polarizing layer, the first optical compensation film being configured to compensate a polarized light obtained from light non-normally incident into the first polarizing layer so that the polarized light becomes a first elliptically polarized light, polarization direction of the first elliptically polarized light is the same as that of a polarized light obtained from light incident into the first polarizing layer at an azimuth angle of 90 degree;
a second optical compensation film disposed between the second polarizing layer and the color filter substrate, a slow axis of which is perpendicular to that of the first optical compensation film, a refractive index and a phase retardation of the second optical compensation film are the same as those of the first optical compensation film respectively, and
wherein the liquid crystal layer is configured to convert the first elliptically polarized light into a second elliptically polarized light, with its polarization direction consistent with that of the first elliptically polarized light and its rotation direction opposite to that of the first elliptically polarized light.

11. The display device of claim 10, wherein
a direction of a slow axis of liquid crystal molecules in the liquid crystal layer is consistent with the transmission axis of the first polarizing layer; or
the direction of the slow axis of the liquid crystal molecules is consistent with a transmission axis of the second polarizing layer; or
the liquid crystal molecules is a mixed liquid crystal molecules formed by a type of liquid crystal molecules with a direction of slow axis consistent with the transmission axis of the first polarizing layer and a type of liquid crystal molecules with a direction of slow axis consistent with the transmission axis of the second polarizing layer.

12. The display device of claim 10, wherein
when the slow axis of the first optical compensation film is parallel to the transmission axis of the first polarizing layer, the refractive index of the first optical compensation film is larger than or equal to 0.25, the phase retardation of the first optical compensation film is 20 nm-280 nm, and a phase retardation of the liquid crystal layer is 270 nm-560 nm.

13. The display device of claim 12, wherein
the refractive index of the first optical compensation film is 0.25, the phase retardation of the first optical compensation film is 270 nm-280 nm, and the phase retardation of the liquid crystal layer is 540 nm-560 nm.

14. The display device of claim 12, wherein
the refractive index of the first optical compensation film is 1, the phase retardation of the first optical compensation film is 80 nm-110 nm, and the phase retardation of the liquid crystal layer is 340 nm-370 nm.

15. The display device of claim 12, wherein
the refractive index of the first optical compensation film is 3.5, the phase retardation of the first optical compensation film is 35 nm-60 nm, and the phase retardation of the liquid crystal layer is 280 nm-320 nm.

16. The display device of claim 10, wherein
when the slow axis of the first optical compensation film is perpendicular to the transmission axis of the first polarizing layer, the refractive index of the first optical compensation film is smaller than or equal to 0.25, the phase retardation of the first optical compensation film is 20 nm-280 nm, and a phase retardation of the liquid crystal layer is 270 nm-560 nm.

17. The display device of claim 16, wherein
the refractive index of the first optical compensation film is 0, the phase retardation of the first optical compensation film is 80 nm-110 nm, and the phase retardation of the liquid crystal layer is 340 nm-370 nm.

18. The display device of claim 16, wherein
the refractive index of the first optical compensation film is −2.85, the phase retardation of the first optical compensation film is 35 nm-60 nm, and the phase retardation of the liquid crystal layer is 280 nm-320 nm.

* * * * *